Sept. 15, 1953  F. H. TABER ET AL  2,651,854
VENTILATED SHOE

Filed Jan. 5, 1952  3 Sheets-Sheet 1

Inventors
Frederic H. Taber
Harold S. Swain
by Roberts Cushman & Grimes
Att'ys.

Inventors
Frederic H. Taber
Harold S. Swain
by Roberts Cushman & Grover
Att'ys.

Sept. 15, 1953　　F. H. TABER ET AL　　2,651,854
VENTILATED SHOE

Filed Jan. 5, 1952　　　　　　　　　　3 Sheets-Sheet 3

Inventors
Frederic H. Taber
Harold S. Swain
by Roberts Cushman & Grover
att'ys.

Patented Sept. 15, 1953

2,651,854

UNITED STATES PATENT OFFICE 2,651,854

VENTILATED SHOE

Frederic H. Taber, New Bedford, and Harold S. Swain, Brockton, Mass.

Application January 5, 1952, Serial No. 265,098

5 Claims. (Cl. 36—3)

This invention pertains to footwear, and more especially to a shoe of the ventilated type. Ever since the dawn of history animal hides and leather have been used predominantly in the manufacture of footwear. To a lesser degree woven fabrics have been employed. Doubtless the choice of these materials was indicated by their availability and by the fact that they are flexible and conformable to the foot. However, the great wear resistance of leather, as compared with woven textiles, has made it preeminent in this field. On the other hand, leather is irregular in thickness and shape; variable in its resistance to stretch, and injuriously affected by moisture; inherent characteristics which make it difficult and wasteful to use in shoemaking, especially in mass production.

The relatively recent developments in the making of sheet materials, for example, rubber sheeting, rubberized textile fabric, or textiles coated and/or impregnated with pyroxylin or other more modern synthetics would seem to provide the shoe industry with a perfect substitute for leather, devoid of the undesirable characteristics of the latter, but the attempted use of these new materials in making shoes led to the discovery of a property of leather and cloth (probably not previously recognized or at least not appreciated as a characteristic essential to the use of a material for shoemaking), that is to say, its ability to "breathe," that is, its capability of permitting the slow passage of moisture or air. Early attempts in the use of rubber and other moisture-impervious materials quickly proved that unless the materials of the shoe is such as to allow the heat and moisture of the foot to escape, the shoe is not only uncomfortable but may be injurious to the wearer's foot.

The use of other sheet materials, for example, coated textile fabric in lieu of leather in many fields of industry has increased enormously in recent years, but, as most such materials are impervious to air or moisture, the use of such materials for shoe uppers has been hindered and substantially prevented, in spite of the fact that such materials are uniform in thickness, attainable in sheets of almost any desired extent and are flexible, relatively cheap as compared with leather, very wear resistant and of pleasing appearance and thus, in these particulars, ideal for use as a shoemaking material.

In the attempt to employ such impervious materials in making shoe uppers, it has heretofore been proposed to provide ventilation for the foot by the use of multitudinous perforations in the upper material (including the outer ply and the lining ply, if the latter is used), and, in such an upper, to arrange the perforations in the outer ply to register with those in the lining. While an upper whose major portion is thus perforated, and so provides ample ventilation may be acceptable for special uses, for example, Summer wear or in sport shoes, its use is very limited. A shoe having an upper of this type would not be desirable for Winter wear; an upper so perforated tends to stretch and quickly lose its shape; such an upper presents difficulty in lasting, to avoid tearing; and it can not be polished by usual methods without soiling the sock and foot of the wearer.

The present invention has for its principal object the provision of a shoe which externally may be of any of the conventional types commonly worn on the street but which is of a construction such as to make possible the employment of sheet materials which are inherently impervious to moisture, in the manufacture of some or all of the constituent parts of the shoe, including the vamp or forepart portion of the upper, with the certainty that a shoe made from this material will possess the requisite breathing capacity to make it comfortable and non-injurious to the wearer. Other and further objects and advantages of the invention will be pointed out in the following more detailed description and by reference to the accompanying drawings wherein:

The invention is herein specifically disclosed as providing ventilation for the vamp or forepart portion of the shoe, as this is the part of the shoe at which the problem of ventilation is most acute.

When herein reference is made to a shoe of "generally conventional construction and appearance," it is thereby intended to say that a shoe in which the present invention is incorporated need not be distinguishable in external appearance from usual shoes designed for all-weather street wear, nor embody major constructional departures from usual shoes of that type.

Figure 6:
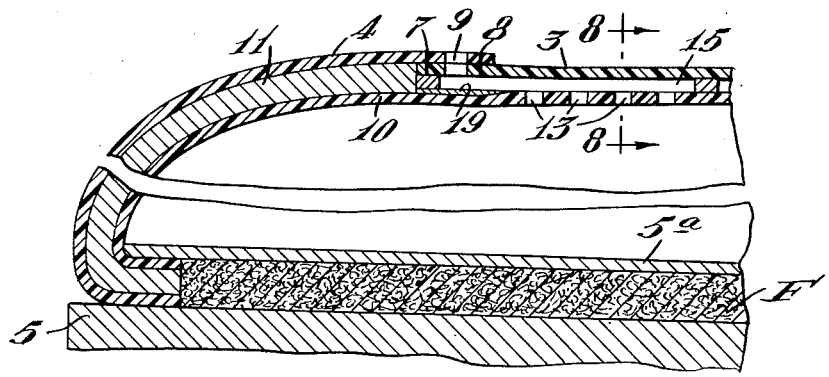
Fig. 6 is a fragmentary, longitudinal, vertical section through the forepart portion and toe end of a shoe upper, shown to very large scale, to illustrate details of the interior construction of the shoe in accordance with the present invention.

Referring to the drawings, the numeral 1 designates a shoe, here shown, for example, as a shoe having an upper comprising the quarter portion 2, the vamp 3 with its tip portion 4, the outer sole 5 and the heel 6. This shoe, as illustrated in Fig. 6, also comprises the insole 5ª and filling material F between the outer sole and the inner sole. In accordance with the present invention the vamp, including its tip portion, may be made of a material which is impervious to moisture, for example, a material having a textile fabric base coated with a flexible substance, normally one of the synthetic plastics, which provides the desired finish, appearance and other leather-simulating characteristics. Resins of the vinyl type provide acceptable coatings. However, it is to be understood that the present invention is not primarily concerned with the particular material chosen to form the shoe vamp, but is broadly directed to the provision of effective ventilation of the forepart portion of the shoe, whether the vamp be of a material commonly recognized as impervious or of a material, including usual upper leather, normally considered to be pervious.

Figure 2:
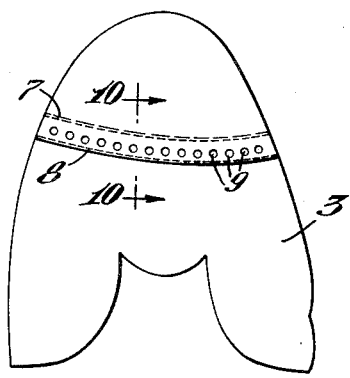
Fig. 2 is a plan view of the vamp of the shoe, including the tip, but before assembly with the other parts.
Figure 10:
Fig. 10 is a fragmentary, longitudinal section through the vamp substantially on the line 10—10 of Fig. 2.

As shown in Figs. 2 and 10, the vamp 3 comprises a rear portion and a tip portion, the rear margin of the tip portion 4 overlapping the forward portion of the rear part and being united to the latter by spaced, parallel sewed seams 7 and 8. Between these seams there is a transversely extending row of perforations 9 such as are commonly employed at this point for ornamental purposes extending through the overlapped plies. Usually the total number of perforations 9 in this row would not exceed twenty. In accordance with the present invention these perforations have a further utility as hereinafter described. These perforations 9 may be varied in size and shape and in their spacing one from the next within a wide range of variation and according to the dictates of styling without sacrifice of their functional utility.

Figure 3:
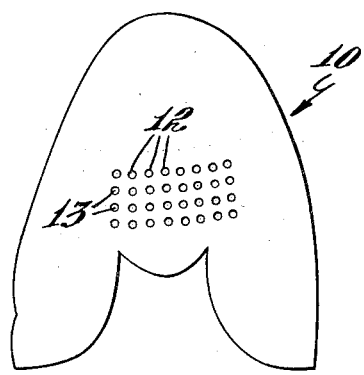
Fig. 3 is a plan view of the vamp lining before assembly with other parts.

In accordance with the present invention, the vamp lining, indicated at 10 in Fig. 3, and which is of the general outline of the vamp with its tip, is provided, at that part which overlies the forepart portion of the foot, with a plurality of longitudinally extending rows 12 of perforations 13. This lining, according to the practice of the present invention, may be of an impervious material of the same general type above referred to, but preferably it is of uncoated textile fabric generally like that commonly used for shoe linings, but desirably of a kind which does not ravel or fray readily at a cut edge or perforation. These rows of perforations 13 may be formed in the vamp lining by a suitable punch, and if the vamp lining be cut by means of a die, this die may be provided with the punches for forming the perforations 13 at the same time that the lining is cut. Adjacent rows 12 of perforations are spaced apart transversely of the lining a distance which preferably corresponds to the spacing of adjacent perforations 9 formed in the vamp, as above described, and are so located that when the vamp lining 10 is assembled with the vamp preparatory to lasting, one of the perforations 9 of the vamp will be aligned with each one of the rows 12 of perforations 13 in the vamp lining. The perforations 13 may be of the same size as the perforations 9 or larger or smaller, as may be desired, although preferably the perforations 13 should be somewhat larger in diameter than the perforations 9, to take care of slight inaccuracies in assembly in the vamp and vamp lining.

Figure 4:
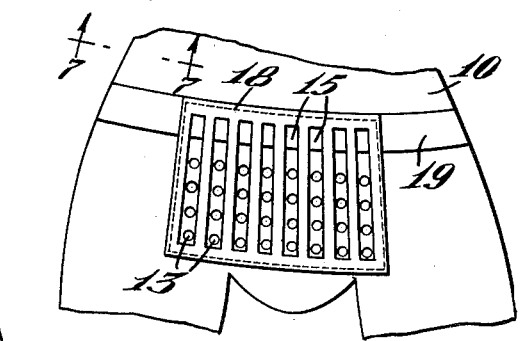
Fig. 4 is a fragmentary plan view, to larger scale than Fig. 3, showing the inner side of the vamp lining with a spacer member according to one embodiment of the present invention applied thereto.
Figure 9:
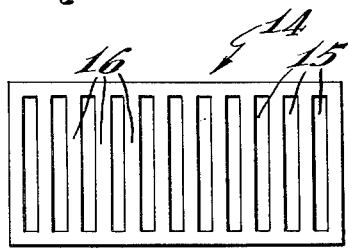
Fig. 9 is a plan view of a preferred form of spacer element.

In accordance with one desirable procedure— before assembly of the vamp and vamp lining— the lining is provided with spacer means which, as illustrated in Figs. 4 and 9 in a preferred form, comprises a substantially rectangular grid 14 formed from suitable, flexible sheet material. The material selected for the purpose should be sufficiently dense so that it is substantially incompressible, that is to say, it does not substantially decrease in thickness in response to the pressures to which it is subjected in shoemaking and during the life of the shoe. A close woven textile material, impregnated with a rubber compound and of approximately $\frac{3}{32}$ inch thick, is cited merely by way of example as giving good results. This spacer member may be cut from the selected sheet material by means of a die having provision for cutting the slots 15 at the same time that the rectangular piece is cut from the sheet of material. The slots 15 in this spacer grid are spaced apart to correspond with the spacing of the rows 12 of perforations 13 in the vamp lining, and when the spacer is assembled (Fig. 4) with the vamp lining (being disposed upon the upper surface of the latter) the slots 15 are so arranged as to register with the several rows 12 of perforations 13. Merely by way of example, and without limiting intent, slots of approximately $\frac{5}{32}$ inch in width have been found to give excellent results. Preferably, although not necessarily (Fig. 6), a thin strip 19 of flexible material, of the same color as the outer surface of the vamp, is arranged to extend across the vamp lining at that part of the latter which underlies the perforations 9 in the vamp when the parts are assembled, thus concealing the vamp lining (which is normally white or light colored) from view through the perforations 9.

Figure 16:
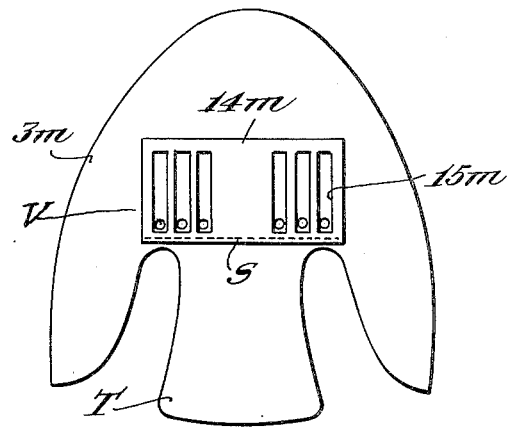
Fig. 16 is a view showing the inside of the vamp having assembled therewith a spacer grid in accordance with the present invention.

The grid or spacer 14 may be secured to the vamp lining by adhesive, but it may be attached to the vamp lining by a seam 18 extending around the priphery of the grid. However, if desired, the spacer may be attached at its front and rear edge only to the vamp, thus providing greater flexibility. The forward top-seam 7 may be used for thus attaching the grid, but the grid should not be caught by the stitches of the rear seam 8. If adhesive 17 be employed instead of or in addition to the sewed seam 18, the adhesive may be applied to the entire area of the spacer so as to stick each of the individual bars 16 to the vamp lining, or it may be applied only to the forward or rear portions of the spacer, leaving the individual bars 16 free from the vamp lining intermediate their ends. It will be observed (Figs. 11 and 16) that the rear edge of the spacer 14 is forward of the junction of the vamp proper with the tongue so that if the tongue be a separate part united by a seam to the vamp proper the presence of the spacer will not add to the thickness at the location of such seam.

After assembling the spacer 14 and the strip 19, if the latter be used, with the vamp lining, the latter is then assembled with the vamp 3 in the usual way in shoemaking and the upper is completed and then assembled with the insole on a last preparatory to lasting. If a toe-box is to be used, such a box 11 (Fig. 6) is interposed between the outer member 4 and the toe end of the vamp lining before the shoe is lasted. In accordance with the present invention, this toe box extends only as far rearwardly as the forward edge of the spacer grid 14. This toe-box may be adhesively united to the tip 4 and to the toe end of the vamp lining in customary manner. A doubler of usual type (not here shown) may, if desired, be interposed between the vamp and vamp lining, and because usual doubler material is of very open weave, it is not needful to perforate it.

Figure 7:
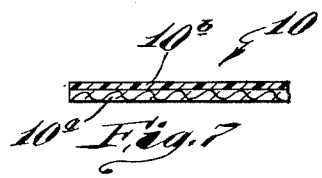
Fig. 7 is a large scale, fragmentary section through the vamp lining substantially on the line 7—7 of Fig. 4.

The vamp 3 with its tip 4, and also the vamp lining 10, may be made pursuant to the practice of the present invention, from impervious sheet material having the desired flexibility, strength and surface appearance. The vamp 3, for example, may consist of a synthetic plastic, sheeted with reinforcing fibers incorporated within the plastic material itself, or, on the other hand, the vamp 3 may be made of a strong material such as a finely woven textile fabric coated or preferably impregnated with the selected impervious material. As illustrated in Fig. 10, the vamp 3 is shown as consisting of a single ply of material which, as above noted, may be a synthetic plastic incorporating reinforcing means. The vamp lining 10 may be of a material generally similar to that used for the vamp, though usually thinner, although it need not have the same surface finish, or, alternatively, and preferably, as above noted, of usual uncoated lining cloth or thin leather. As illustrated in Fig. 7, the lining material comprises an inner ply 10ª of textile fabric and an outer coating ply 10ᵇ of impervious material, and, as above suggested, the vamp 3 may be of a similar structure. On the other hand, as noted above, the lining may consist of single ply material.

In the completed shoe, the perforations 13 in the vamp lining open into the slots 15 in the grid or spacer member 14, each of these slots forming a channel or passageway leading from some of the perforations 13 in the vamp lining to perforations 9 in the vamp. Thus there is provided free communication between the interior of the shoe and the exterior by way of the perforations 13, the slots or channels 15, and the perforations 9. In a shoe thus constructed, the movement of the foot in walking constantly pumps air in and out through these passageways, thus providing adequate breathing in spite of the fact that the vamp (and also the lining) may, if desired, be of a material which is normally impervious both to air and moisture.

Figure 1:
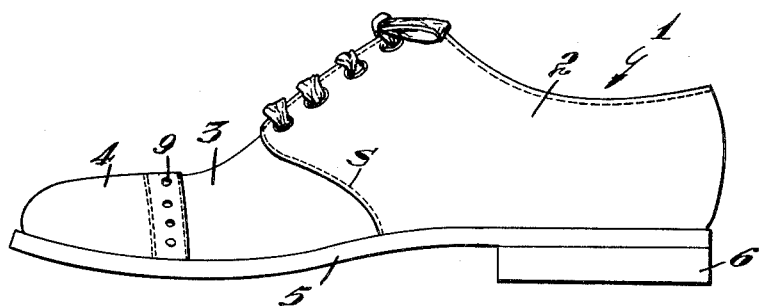
Fig. 1 is a side elevation of a shoe of a generally conventional type but incorporating the present invention.

The location of the perforations and channels, as hereabove described, has been found desirable and very effective in providing the desired ventilation, but it is contemplated that these perforations and channels may be arranged at some other part of the shoe, if desired, where it is possible to locate the perforations in the vamp without detracting from the desired exterior appearance of the shoe. Thus, a construction similar to that above described may be employed in the quarter 2 of the shoe, with perforations (not shown) corresponding to the perforations 9 located, for example, adjacent to the seam S (Fig. 1) which unites the quarter and vamp. Likewise, instead of a single group of perforations and channels at the arch of the foot, separate groups may be arranged at opposite sides of the forepart of the shoe, the channels then leading to the perforations 9 which are located at the right and left parts of the forepart of the shoe.

Figure 5:
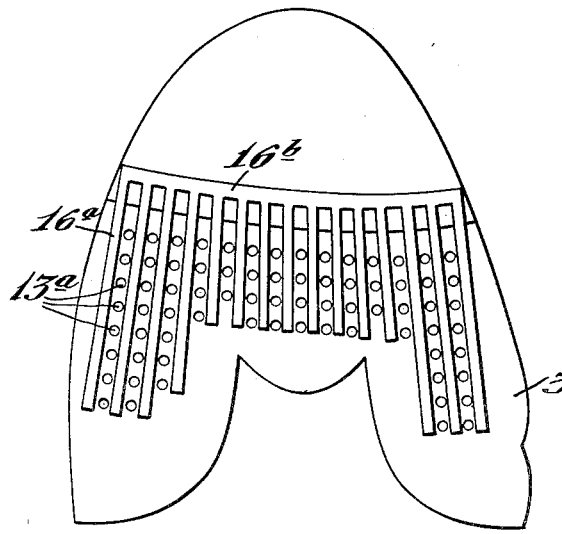
Fig. 5 is a view generally similar to Fig. 4 but showing spacing means of a modified construction.

It has been found that perforations located as above described and in number approximating those herein illustrated provide ample ventilation for average weather conditions. Obviously a greater or lesser number of perforations may be provided when the shoe is to be worn under unusual conditions. For example, a greater number of lining perforations and channels may be provided, if desired, as illustrated in Fig. 5, where the rows of perforations 13ª extend almost all of the way across the width of the vamp lining 3ª, and those at the sides extend rearwardly almost to those parts of the vamp which join the quarter. In the arrangement shown in Fig. 5, the spacer comprises the parallel bars 16ª but these bars are united only at their forward ends to the transversely extending connector member 16ᵇ. At their rear ends they are free from each other, and in this arrangement it is contemplated that each of the bars will be individually cemented throughout its length to the vamp lining 3ª. It is further contemplated that the bars 16ª may be entirely independent of each other, if desired, instead of being joined by the transverse member 16ᵇ, but the employment of individual bars involves considerable care in applying them to the vamp lining, and an arrangement such as that shown in Figs. 4 or 9 is preferred wherein all of the several bars are connected at their opposite ends to form a grid unit which may be applied in a single operation to the vamp lining.

Figure 8:
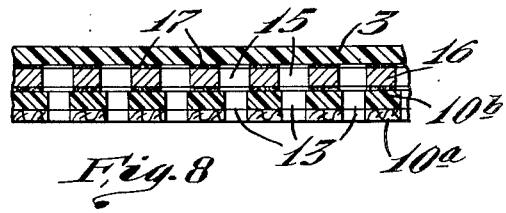
Fig. 8 is a fragmentary, transverse, vertical section, to larger scale than Fig. 6, on the plane of the line 8—8 of Fig. 6.
Figure 11:
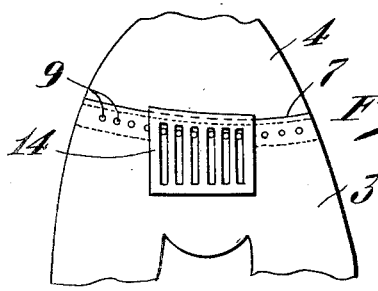
Fig. 11 is a fragmentary view of the inside of a vamp according to the present invention, illustrating a slight modification.

In Fig. 11 a modification is illustrated wherein the spacer grid 14 is secured to the inside surface of the vamp 3 instead of to the vamp lining. This spacer grid 14 is preferably like that previously described and shown in Fig. 9, and may be attached to the inner side of the vamp in any of the ways above suggested but conveniently is secured to the vamp at its forward edge by the same seam 7 which unites the tip to the vamp proper. If desired, the rear or remaining portion of the grid may be secured to the vamp by adhesive 17 in the same way as illustrated in Fig. 8. This procedure may be employed whenever it is found more convenient to attach the spacer grid to the vamp than to the vamp lining.

Figure 12:
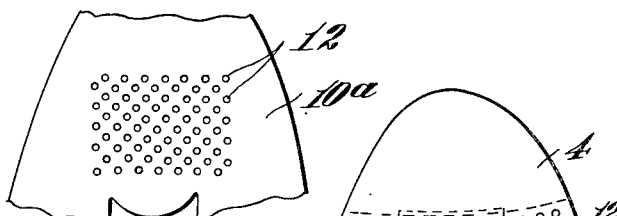
Fig. 12 is a fragmentary plan view of a vamp lining of a modified construction.
Figure 13:
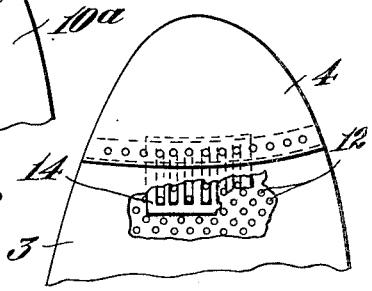
Fig. 13 is a plan view of the upper or outside element of the vamp with parts broken away to show the assembled lining and spacer grid.

In Figs. 12 and 13 a slight further modification is suggested wherein the openings 12 in the vamp lining 10ª are arranged in staggered relation rather than in uninterrupted rows extending from front to rear. With this arrangement extreme accuracy in registration of the channels in the spacer grid with the rows of openings in the vamp lining is not necessary since under all ordinary circumstances the channels in the spacer grid will register with some, at least, of the openings 12.

As hereinbefore described, the spacer grid may be made from sheet material and secured, as a unit, to the vamp lining or vamp by stitching and/or adhesive. However, it is contemplated that the channels 15 may be provided in other ways, for example, by depositing upon the vamp lining or vamp lines of material in plastic condition, for example, a thermoplastic which, in setting, forms ribs of the requisite thickness and longitudinal flexibility which inherently adhere to the vamp lining or vamp but which do not substantially compress or decrease in vertical thickness during the life of the shoe.

Figure 14:
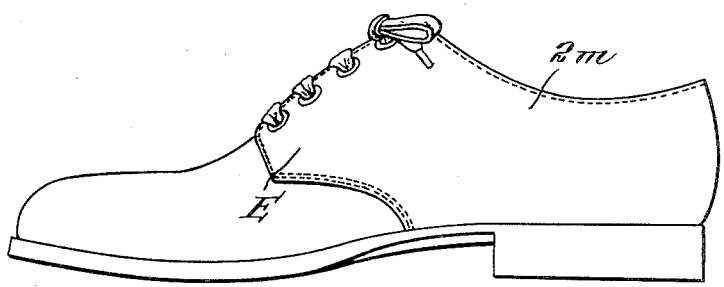
Fig. 14 is a side elevation of a tipless shoe of the Blucher type embodying the present invention.
Figure 15:
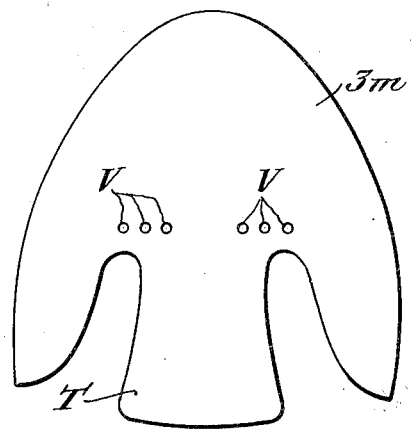
Fig. 15 is a plan view of the vamp of the shoe of Fig. 14, before its assembly with other parts.
Figure 17:
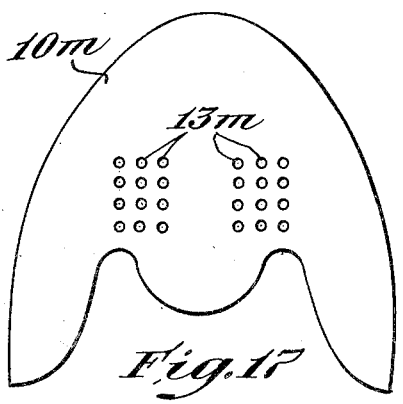
Fig. 17 is a plan view of the vamp lining.

If the invention is to be embodied in a tipless shoe, for example, a shoe of the Blucher type such as illustrated in Fig. 14, the vamp 3ᵐ (Fig. 15), which is usually provided with an integral tongue T, is perforated to provide a transversely extending row of ventilating openings V closely adjacent to the junction of the tongue with the vamp proper. Preferably this row of ventilating openings is interrupted at the central part of the vamp, since the central part of the vamp, at the base of the tongue, is visible when the shoe is worn. A spacer grid 14ᵐ (Fig. 16), which may be similar to the grid previously described, is adhesively secured to the inside of the vamp so that its slots 15ᵐ register at their rear ends with the ventilating openings V. Preferably, a seam S extends across the upper or rear end of the spacer grid so as securely to unite it to the vamp. The vamp lining 10ᵐ (Fig. 17) is of the usual type and material except that it is provided with perforations 13ᵐ such as the perforations 13 previously described.

When the parts are assembled, each channel 15ᵐ of the spacer grid communicates with one or more of the perforations 13ᵐ, and since the channels also communicate with the ventilating openings V there are thus provided passages through which air may flow inwardly or outwardly, providing ventilation for the foot. In the completed shoe the forward ends E of the wing portions of the quarter 2ᵐ of the shoe overlap and conceal the ventilating openings V, although the overlapping wings do not fit down snugly against the outer surface of the vamp sufficiently close to close the ventilating openings.

It will be evident that the practice of the present invention is wholly independent of the type of shoe selected and regardless of the system of lasting or method of attaching the outersole which may be employed.

While certain desirable embodiments of the invention have herein been illustrated and described by way of example, it is to be understood that the invention is broadly inclusive of any and all modifications falling within the scope of the appended claims.

We claim:

1. A shoe comprising a vamp, a vamp lining and a tip whose rear marginal portion overlies the vamp, the shoe having registering openings in the overlapping portions of the tip and vamp, a grid of flexible material interposed between the vamp and vamp lining at the forepart portion of the shoe, the grid having slots registering with the aforesaid openings, and the vamp lining having apertures rearwardly of said tip, which communicate with the slots in the grid.

2. A shoe according to claim 1, having a toe box whose rear edge abuts the forward edge of the vamp and which extends forwardly from said edge to form a support for the tip.

3. A shoe according to claim 1, wherein the openings through the overlapping portions of the tip and vamp are disposed in a row extending transversely of the shoe, and the slots in the grid are so arranged that the forward end of each slot registers with one of said openings respectively.

4. A shoe according to claim 1 wherein the grid is substantially rectangular in contour, consisting of inelastic sheet material, the margin of the grid being uninterrupted throughout its entire periphery, the slots in the grid extending longitudinally of the grid and through its entire thickness and being of uniform width from end to end.

5. A shoe according to claim 1 wherein a ply of textile fabric, inside of the vamp, is of so open a weave as to provide apertures between its constituent threads through which air may pass.

FREDERIC H. TABER.
HAROLD S. SWAIN.

References Cited in the file of this patent

UNITED STATES PATENTS

| Number | Name | Date |
|---|---|---|
| 682,182 | Ellings | Sept. 10, 1901 |
| 1,623,092 | Carr | Apr. 5, 1927 |
| 1,772,340 | Daniels | Aug. 5, 1930 |
| 1,946,986 | Reed et al. | Feb. 13, 1934 |

FOREIGN PATENTS

| Number | Country | Date |
|---|---|---|
| 18,566 | Great Britain | Jan. 17, 1907 |
| 145,968 | Germany | Nov. 12, 1903 |